United States Patent
Song et al.

(10) Patent No.: US 11,624,817 B2
(45) Date of Patent: Apr. 11, 2023

(54) METHOD FOR CONFORMAL ARRAY PATTERN SYNTHESIS BASED ON SOLUTION SPACE PRUNING PARTICLE SWARM OPTIMIZATION ALGORITHM

(71) Applicant: ZHEJIANG UNIVERSITY, Zhejiang (CN)

(72) Inventors: Chunyi Song, Hangzhou (CN); Xin Wang, Hangzhou (CN); Dingke Yu, Hangzhou (CN); Yuzhang Xi, Hangzhou (CN); Wenwei Fang, Hangzhou (CN); Zhiwei Xu, Hangzhou (CN); Huan Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/804,594

(22) Filed: May 30, 2022

(65) Prior Publication Data
US 2022/0299623 A1    Sep. 22, 2022

Related U.S. Application Data

(63) Continuation-in-part of application No. PCT/CN2021/109108, filed on Jul. 29, 2021.

(30) Foreign Application Priority Data

Mar. 8, 2021   (CN) .......................... 202110251847.7

(51) Int. Cl.
*G01S 13/526* (2006.01)
*G06F 17/14* (2006.01)

(52) U.S. Cl.
CPC .......... *G01S 13/526* (2013.01); *G06F 17/142* (2013.01)

(58) Field of Classification Search
CPC .............................. G01S 13/56; G06F 17/142
See application file for complete search history.

(56) References Cited

U.S. PATENT DOCUMENTS 5,347,287 A * 9/1994 Speciale .............. H01Q 21/061
                                                            342/368
9,395,718 B1 * 7/2016 Church .............. G05B 19/4097
(Continued)

FOREIGN PATENT DOCUMENTS

CN    104393414 A    3/2015
CN    106126836 A    11/2016
(Continued)

OTHER PUBLICATIONS

First Office Action in Chinese Application No. 202110251847.7 dated Apr. 2, 2022, 8 pages.
(Continued)

*Primary Examiner* — Marcus E Windrich
(74) *Attorney, Agent, or Firm* — Metis IP LLC

(57) ABSTRACT

The present disclosure provides a method for conformal array pattern synthesis based on a solution space pruning particle swarm optimization algorithm (PSO), the method comprises taking a suppression index of a peak side lobe level (SLL) as a first index, obtaining the first array element excitation satisfying the first index under the constraint of the dynamic range ratio (DRR) of the array element excitation amplitude through iterations; obtaining a second array element excitation satisfying the multiple optimization objectives under the constraint of the DRR of the array element excitation amplitude by a solution algorithm according to the first array element excitation.

2 Claims, 10 Drawing Sheets

(56) References Cited

U.S. PATENT DOCUMENTS

| | | | | |
|---|---|---|---|---|
| 9,843,103 B2* | 12/2017 | Bowers | ............... | H01Q 3/24 |
| 9,912,055 B2* | 3/2018 | Moon | ............ | H04B 17/3913 |
| 2020/0358206 A1 | 11/2020 | Stumme et al. | | |

FOREIGN PATENT DOCUMENTS

| | | | |
|---|---|---|---|
| CN | 106886656 A | 6/2017 |
| CN | 107657070 A | 2/2018 |
| CN | 109813967 A | 5/2019 |
| CN | 113033080 A | 6/2021 |

OTHER PUBLICATIONS

International Search Report in PCT/CN2021/109108 dated Nov. 17, 2021, 8 pages.
Written Opinion in PCT/CN2021/109108 dated Nov. 17, 2021, 8 pages.

* cited by examiner

100

110 taking a suppression index of a peak side lobe level (SLL) as a first index, and obtaining a first array element excitation satisfying the first index under a constraint of a dynamic range ratio (DRR) of array element excitation amplitude by iterations

120 obtaining a second array element excitation satisfying multiple optimization objectives under the constraint of the DRR of the array element excitation amplitude by a solution algorithm according to the first array element excitation

FIG. 1

600 a first array element excitation

↓ determining an initialization value range of the particles based on a first array element excitation and a range of the array element excitation amplitude ~ 610

↓ randomly initializing positions and speeds of the particles ~ 620

↓ calculating a particle fitness and updating an individual optimal value and a global optimal value of population ~ 630

↓ calculating and updating the positions and speeds of the particles ~ 640

↓ updating the inertia weight coefficient ~ 650

↓ reaching the maximum number of the iterations

No → (back to 630)

Yes ↓ taking the particles satisfying preset conditions as a second array element excitation ~ 660

FIG. 6

METHOD FOR CONFORMAL ARRAY PATTERN SYNTHESIS BASED ON SOLUTION SPACE PRUNING PARTICLE SWARM OPTIMIZATION ALGORITHM

CROSS-REFERENCE TO RELATED APPLICATIONS

This application is a continuation-in-part application of International Patent Application No. PCT/CN2021/109108, filed on Jul. 29, 2021, which claims priority to Chinese Patent Application No. 202110251847.7, filed on Mar. 8, 2021, the entire contents of each of which are hereby incorporated by reference.

TECHNICAL FIELD

The present disclosure generally relates to the field of array antenna, and in particular, to methods for conformal array pattern synthesis based on solution space pruning particle swarm optimization algorithm (PSO).

BACKGROUND

In recent years, with the rapid development of radar system, its application scenarios are becoming more and more extensive. As the core part of the electromagnetic transceiver of the radar system, the array antenna needs to produce a specific far-field pattern for different use requirements under different application scenarios. However, the higher dynamic range ratio (DRR) of an array element excitation amplitude will increase a design difficulty of a feed network and increase cost of an array feed network during generating a conformal array pattern.

Therefore, it is necessary to provide a method for conformal array pattern synthesis based on solution space pruning PSO, which not only generates a desired array pattern, but also limits the DRR of the array element excitation to a reasonable range.

SUMMARY

One aspect of some embodiments of the present disclosure provides a method for conformal array pattern synthesis based on a solution space pruning particle swarm optimization algorithm (PSO). The method includes:

S1: taking a suppression index of a peak side lobe level (SLL) as an only index, realizing an array element excitation conversion between a conformal array and a uniform array based on an excitation conversion relationship between a projection array and the conformal array as well as a least square relationship between array element excitation of the projection array and array element excitation of the uniform array, and calculating and processing a pattern quickly by an inverse fast Fourier transform algorithm (IFFT) and a fast Fourier transform algorithm (FFT) to obtain an array element excitation of the conformal array satisfying the suppression index of the peak SLL under a constraint of a dynamic range ratio (DRR) of array element excitation amplitude; and S2: according to the array element excitation of the conformal array obtained by the S1, pruning a solution space of the PSO, designing a nonlinear updated weight coefficient to ensure sufficient global search, designing a fitness function according to multiple optimization objectives, and further optimizing the conformal array pattern to obtain the array element excitation of the conformal array satisfying the multiple optimization objectives under the constraint of the DRR of the array element excitation amplitude, wherein the S1 is realized by following sub steps:

S1.1: setting the multiple optimization objectives according to design indexes, the multiple optimization objectives including a suppression index of a peak SLL in a normalized far-field pattern, a first null maximum width of main beam ($FNMW_e$), expected null positions ($NULL_{point_e}$), and null depths ($NULL_{value_e}$);

S1.2: calculating a wavelength $\lambda$ by setting a count of array elements as N, serial numbers of the array elements as 1~N, a working center frequency of array elements as $f$:

$$\lambda = \frac{c}{f} \tag{1}$$

where $c=3\times10^8$ m/s, c denotes an electromagnetic wave velocity in vacuum;

setting a spacing of the array elements as $$\frac{\lambda}{2},$$

establishing a global coordinate system by taking a tangent direction of a symmetrical center point of an array as an x-axis direction and a normal direction of the symmetrical center point of the array as a y-axis direction, converting a pattern function $f(\theta)$ of each array element among the array elements in a local coordinate system to a pattern function $f_n(\theta)$ of each array element among the array elements in the global coordinate system, and calculating a far-field pattern $F(\theta)$ of the conformal array:

$$F(\theta) = \sum_{1}^{N} A_n f_n(\theta) \cdot \exp(jk\vec{r_n}\cdot\vec{r}) \tag{2}$$

where $A_n$ is an excitation of a $n^{th}$ array element;

$$k = \frac{2\pi}{\lambda},$$

which is a wavenumber; $\vec{r}$ is a far-field direction of the main beam; $\vec{r_n}$ is a position vector of the $n^{th}$ array element in the global coordinate system; and j represents an imaginary unit;

S1.3: setting a maximum DRR of the array element excitation amplitude of the conformal array as drr, and expressing the array element excitation $A_n$ as:

$$A_n = I_n \cdot \exp(j\alpha_n) \tag{3}$$

where $I_n$ is an excitation amplitude of the $n^{th}$ array element, $\alpha_n$ is an excitation phase of the $n^{th}$ array element, calculating a range of $I_n$ to be $$\left[\frac{1}{drr}, 1\right],$$

$\alpha_n = -k\vec{r_n}\cdot\vec{r_0}$, where $\vec{r_0}$ is a position vector of a direction of the main beam in the global coordinate system;

S1.4: randomly initializing the array element excitation of the conformal array within the range of the excitation amplitude determined by the S1.3;

S1.5: setting the direction of the main beam $\theta_0=0°$ as a y-axis direction of the global coordinate system, projecting the conformal array in the direction of the main beam to obtain the projection array, wherein x-axis coordinates of array elements of the projection array are equal to those of corresponding array elements of the conformal array, and a y-axis coordinate is 0; based on an approximately equal peak side lobe level relationship, calculating the excitation conversion relationship between the projection array and the conformal array by following formula:

$$I_{pn} = \frac{I_n \cdot |f_n(\theta_0)|}{|f(\theta_0)|} \quad (4)$$

where $I_{pn}$ is an excitation amplitude of the $n^{th}$ array element of the projection array; $|f_n(\theta_0)|$ is an array element pattern amplitude of the $n^{th}$ array element of the conformal array in the direction of the main beam; $|f(\theta_0)|$ is an array element pattern amplitude of the projection array in the direction of the main beam;

converting the projection array into the uniform array with a smaller spacing by interpolating the projection array according to the smaller spacing, wherein array element of each projection array is represented by a section of array elements of the uniform array centered on the array element of the projection array element; based on a least square relationship between a guidance vector matrix of the projection array and a guidance vector matrix of the uniform array, obtaining an excitation conversion relationship matrix between the projection array and the uniform array:

$$E_C = (E_e^H E_e)^{-1} E_e^H E_p \quad (5)$$

where $E_p$ is a guidance vector matrix of the projection array, $E_e$ is a guidance vector matrix of the uniform array, $E_C$ is a conversion matrix satisfying the least square relationship;

S1.6: obtaining a far-field pattern of the uniform array, which is a product of an array factor and an array element pattern, wherein the array factor is calculated according to an inverse Fourier transform between the uniform array and the array factor;

S1.7: according to the suppression index of the peak SLL, correcting a value of a pattern sampling point exceeding the suppression index of the peak SLL to a value satisfying the suppression index of the peak SLL;

S1.8: obtaining the array factor by dividing a corrected pattern by the array element pattern, and obtaining array element excitation of the uniform array by Fourier transform;

S1.9: obtaining the array element excitation of the conformal array by inverse operation of the formulas (4) and (5);

S1.10: according to the range of the array element excitation amplitude being $$\left[\frac{1}{drr}, 1\right],$$

correcting the array element excitation of the conformal array to cause it satisfying the constraint of the DRR of the array element excitation amplitude;

S1.11: iteratively performing S1.5-S1.10, if the array element excitation of the conformal array satisfies the DRR and the pattern satisfies the suppression index of the peak SLL, stopping iteration, otherwise, running to a set maximum number of the iterations to obtain the array element excitation of the conformal array satisfying the suppression index of the peak SLL.

Further, the S2 is realized by following sub steps:

S2.1: based on the array element excitation of the conformal array obtained from S1 and the range of the array element excitation amplitude of $$\left[\frac{1}{drr}, 1\right]$$

obtained from the S1.3, pruning the solution space reasonably, each dimension of the particles in the solution space corresponding to one array element excitation of the conformal array, determining a search range of the solution space in a $i^{th}$ dimension as follows:

$$X_i^L = \max\left(X_i^{init} - \sigma, \frac{1}{drr}\right) \quad (6)$$

$$X_i^U = \min(X_i^{init} + \sigma, 1) \quad (7)$$

where $X_i^L$ is a lower limit of search range of the particles in the $i^{th}$ dimension, $X_i^U$ is an upper limit of the search range of the particles in the $i^{th}$ dimension, $X^{init}$ is a vector formed by the array element excitation of the conformal array obtained from the S1, dimensions of the $X^{init}$ are equal to the count of the array element of the conformal array, $X_i^{init}$ is a $i^{th}$ dimension of the $X^{init}$, $\sigma$ is a pruning factor of the solution space, which represents a range of the solution space reserved near the array element excitation of the conformal array obtained from the S1;

S2.2: randomly initializing positions and speeds of the particles in the solution space after pruning;

S2.3: calculating a particle fitness according to following formula, and updating an individual optimal value and a global optimal value of population:

$$f=\mu_1 \cdot sll_{total} + \mu_2 \cdot \max((FNMW - FNMW_e), 0) + \mu_3 \cdot (10 \cdot |NULL_{point} - NULL_{point_e}| + |NULL_{value} - NULL_{value_e}|) \quad (8)$$

where $sll_{total}$ is a sum of values of the pattern sampling points higher than the suppression index of the peak SLL in values of all pattern sampling points; FNMW and $FNMW_e$ are an actual value and an expected value of the first null beam width; $NULL_{point}$ and $NULL_{point_e}$ are an actual value and an expected value of the null position; $NULL_{value}$ and $NULL_{value_e}$ are an actual value and an expected value of a null value; $\mu_1$, $\mu_2$, and $\mu_3$ are weight coefficients;

S2.4: calculating and updating the positions and speeds of the particles by following formulas:

$$V_{id}^k = \omega V_{id}^{k-1} + c_1 r_1 (pbest_{id} - X_{id}^{k-1}) + c_2 r_2 (gbest_d - X_{id}^{k-1}) \quad (9)$$

$$X_{id}^k = X_{id}^{k-1} + V_{id}^k \quad (10)$$

where $\omega$ is an inertia weight coefficient, $c_1$ and $c_2$ are acceleration factors; $r_1$ and $r_2$ are random numbers satisfying a uniform distribution within a range of [0,1]; $pbest_{id}$ is the individual optimal value; $gbest_d$ is the global optimal value, $V_{id}^k$ is a velocity of the particles in the $i^{th}$ dimension during a $k^{th}$ iteration, $X_{id}^{k}$ is a position of the particles in the $i^{th}$ dimension during the $k^{th}$ iteration;

S2.5: in order to emphasize sufficient global search during a search process, updating nonlinearly the inertia weight coefficient ω by following formula:

$$\omega = \left(1 - \left(\frac{k}{T}\right)^3\right) \cdot \omega_r + \omega_0 \quad (11)$$

where k is a current number of the iterations, T is a maximum number of the iterations, $\omega_r$ is a scaling factor of a range of ω, $\omega_0$ is a minimum value of the range of ω;

S2.6: if the maximum number of the iterations is reached, stopping operation, otherwise turning back the S2.3; finally, obtaining the array element excitation of the conformal array satisfying the optimization objectives set by the S1.

BRIEF DESCRIPTION OF THE DRAWINGS

This present disclosure will be further described in a form of exemplary embodiments, which will be described in detail by the accompanying drawings. These embodiments are not restrictive, in these embodiments, the same number represents the same structure, wherein:

FIG. 1 is a flowchart illustrating an exemplary process of a method for conformal array pattern synthesis based on solution space pruning particle swarm optimization algorithm (PSO) according to some embodiments of the present disclosure;

FIG. 6 is a flowchart illustrating an exemplary process of a method for obtaining a second array element excitation according to some embodiments of the present disclosure;

DETAILED DESCRIPTION

Figure 2:
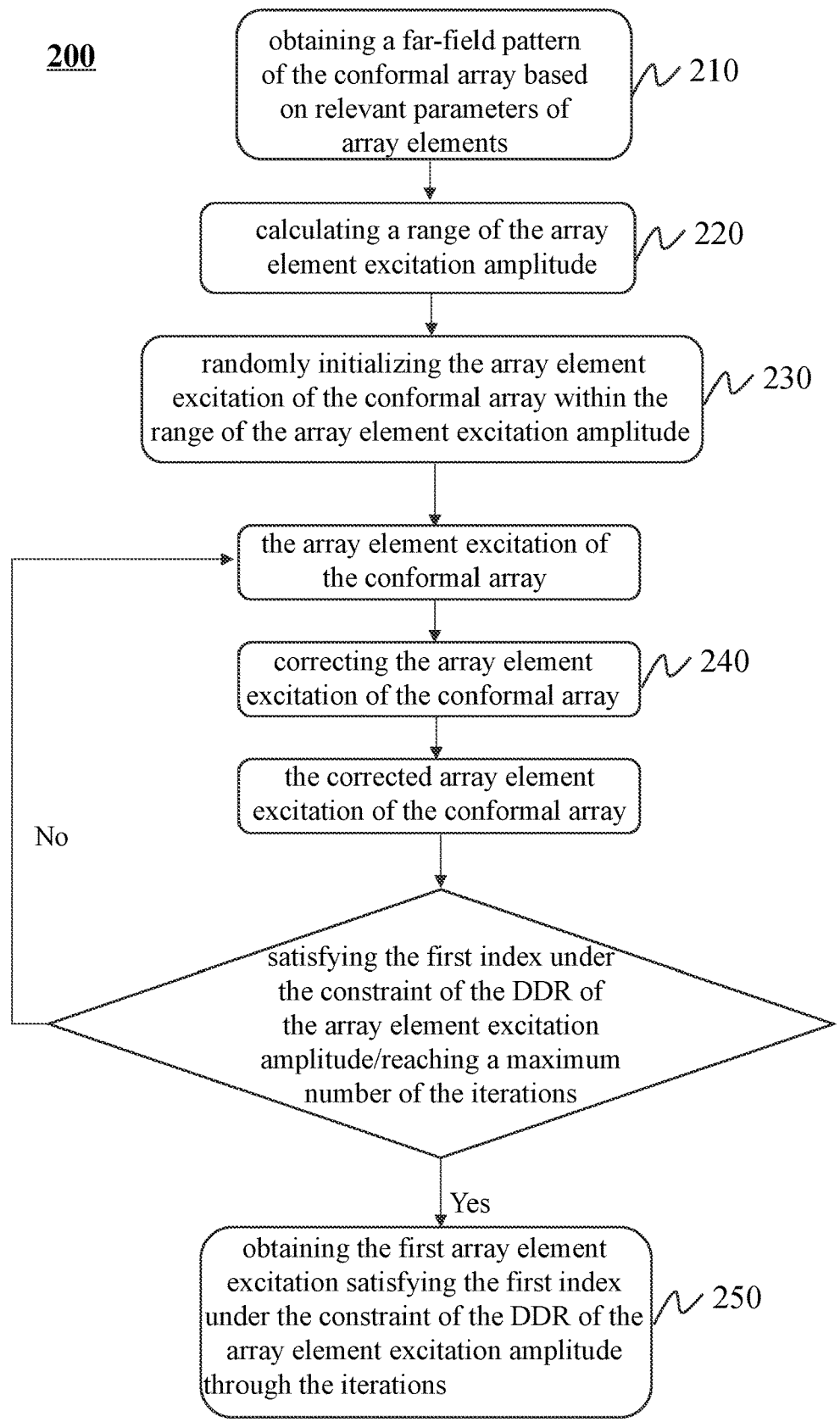
FIG. 2 is a flowchart illustrating an exemplary process of a method for obtaining a first array element excitation according to some embodiments of the present disclosure.

In order to more clearly explain the technical scheme of the embodiment of the present disclosure, the accompanying drawings required in the description of the embodiment will be briefly introduced below. Obviously, the drawings in the following description are only some examples or embodiments of the present disclosure. For those skilled in the art, the present disclosure may also be applied to other similar situations according to these drawings without paying creative labor. Unless it is obvious from the language environment or otherwise stated, the same label in the figure represents the same structure or operation.

It should be understood that the "system", "device", "unit" and/or "module" used herein is a method for distinguishing different components, elements, components, parts or assemblies at different levels. However, if other words may achieve the same purpose, they may be replaced by other expressions.

As shown in the description and claims, the words "one", and/or "this" do not specifically refer to the singular, but may also include the plural, unless there are specific exceptions. Generally speaking, the terms "include" and "include" only indicate that the steps and elements that have been clearly identified are included, and these steps and elements do not constitute an exclusive list, and the method or equipment may also contain other steps or elements.

A flowchart is used in the present disclosure to illustrate the operation performed by the system according to the embodiment of the present disclosure. It should be understood that the previous or subsequent operations are not necessarily performed accurately in order. Instead, the steps may be processed in reverse order or simultaneously. At the same time, you may add other operations to these processes or remove one or more steps from these processes.

In modern wireless communication systems, conformal array antennas have different shapes, which may be conformal with platform surfaces of high-speed carriers such as aircrafts, missiles, and satellites, and do not damage the shape, structure and aerodynamic characteristics of the carriers. The array antenna needs to produce a specific far-field pattern for different use requirements during different application scenarios of radar system.

It is necessary to optimize array element excitation of a conformal array according to a dynamic range ratio (DRR) of array element excitation amplitude and a suppression index of a peak side lobe level (SLL) during generating a pattern. In other scenarios, it is also necessary to optimize the array element excitation of the conformal array according to a first null maximum width of main beam, expected null positions, and null depths.

FIG. 1 is a flowchart illustrating an exemplary process of a method for conformal array pattern synthesis based on solution space pruning particle swarm optimization algorithm (PSO) according to some embodiments of the present disclosure. As shown in FIG. 1, the process 100 includes the following steps:

In step 110, taking the suppression index of the peak SLL as a first index, and obtaining a first array element excitation satisfying the first index under a constraint of a DRR of array element excitation amplitude by iterations.

In an antenna lobe pattern, a lobe with a largest radiation intensity may be called a main lobe, and the remaining lobe may be called a side lobe. A peak SLL may refer to a ratio of a maximum value of antenna side lobe to a maximum value of the main lobe, which may be usually expressed in decibels. In antenna design, the peak SLL may be required to be lower than a certain value, which may be called the suppression index of the peak SLL. In some embodiments, the suppression index of the peak SLL may be different according to different antenna design requirements. For example, the suppression index of the peak SLL may be −15 dB, −20 dB, −35 dB, etc.

A conformal array antenna may contain multiple array elements with different excitation amplitude. The DRR of the array element excitation amplitude may refer to a range from a minimum excitation amplitude to a maximum excitation amplitude of the array element. A higher DRR of the array element excitation amplitude may increase design difficulty of a feed network and increase cost of array feed network. Therefore, the DRR of the array element excitation amplitude may be required to limit to a reasonable range while generating a desired array pattern. In some embodiments, the DRR of the array element excitation amplitude may be set according to design requirements of the conformal array antenna. For example, a maximum value of the DRR of the conformal array element excitation amplitude may be set as drr=5.

In some embodiments, taking the suppression index of the peak SLL as the first index, the first array element excitation satisfying the first index under the constraint of the DRR of the array element excitation amplitude may be obtained by the iterations. More descriptions regarding the method for obtaining the first array element excitation may be found elsewhere in the present disclosure, e.g., FIG. 2 and the relevant descriptions thereof.

In step 120, obtaining a second array element excitation satisfying multiple optimization objectives under the constraint of the DRR of the array element excitation amplitude by a solution algorithm according to the first array element excitation.

The solution algorithm may refer to an algorithm that optimizes the first array element excitation to obtain the second array element excitation satisfying the multiple optimization objectives. In some embodiments, the solution algorithm may include the PSO, genetic algorithm, etc.

The multiple optimization objectives may refer to multiple target values that need to be achieved in the process of antenna design optimization. In some embodiments, the multiple optimization objectives may include one or more of the suppression index of the peak SLL, a first null maximum width of main beam $FNMW_e$, expected null positions $NULL_{point_e}$, and null depths $NULL_{value_e}$. In some embodiments, the optimization objectives may be set according to design indexes. For example, the following optimization objectives may be set according to antenna design indexes, including a suppression index of a peak SLL in a normalized far-field pattern as −35 dB, the first null maximum width of the main beam $FNMW_e=10°$, the expected null position $NULL_{point_e}=±30°$, and the null depth $NULL_{value_e}=−60$ dB.

In some embodiments, the second array element excitation satisfying the multiple optimization objectives under the constraint of the DRR of the array element excitation amplitude may be obtained by the solution algorithm according to the first array element excitation.

In some embodiments, the solution algorithm may be a genetic algorithm.

Descriptions regarding the solution algorithm may be found in elsewhere in the present disclosure, e.g., FIG. 6 and relevant descriptions thereof.

The methods described in the above embodiments may limit the DRR of the array element excitation amplitude to a reasonable range while generating the desired array pattern through multiple iterative calculations in two steps. At the same time, the solution algorithm may search more comprehensively and accurately in the solution space through the optimization design of the algorithm, which may improve the problem of slow search speed and easy to fall into local convergence of the conformal array pattern generation method.

It should be noted that the above description of the process 100 is only for example and explanation, and not limited the scope of application of the present disclosure. For those skilled in the art, various corrections and changes may be made to the process 100 under the guidance of the present disclosure. However, these corrections and changes are still within the scope of the present disclosure.

In some embodiments, taking the suppression index of the peak SLL as the first index, the first array element excitation satisfying the first index under the constraint of the DDR of the array element excitation amplitude may be obtained through the iterations, including: in at least one round of first iteration, based on an excitation conversion relationship between the conformal array and the projection array, obtaining a fourth array element excitation from a conversion of a third array element excitation, the third array element excitation being the array element excitation of the conformal array and the fourth array element excitation being the array element excitation of the projection array; based on an excitation conversion relationship between the projection array and the uniform array, obtaining a fifth array element excitation from a conversion of the fourth array element excitation, and the fifth array element excitation being an array element excitation of the uniform array; obtaining array factors by calculating the fifth array element excitation using an inverse fast Fourier transform algorithm (IFFT), and obtaining a second pattern through multiplying the array factors by a first pattern, the first pattern being an array element pattern, and the second pattern being a far-field pattern corresponding to the uniform array; determining a third pattern by performing a first correction to the second pattern based on the first index; obtaining the array factor through dividing the third pattern by the first pattern, and calculating the sixth array element excitation through a fast Fourier transform algorithm (FFT), the sixth array element excitation being the array element excitation of the uniform array after a first correction; based on the excitation conversion relationship between the projection array and the uniform array, obtaining a seventh array element excitation from a conversion of the sixth array element excitation, and the seventh array element excitation being the array element excitation of the projection array after the first correction; based on the excitation conversion relationship between the conformal array and the projection array, obtaining an eighth array element excitation from the conversion of the seventh array element excitation, and the eighth array element excitation being the array element excitation of the conformal array after the first correction; determining a ninth array element excitation by performing a second correction to the eighth array element excitation based on a range of the array element excitation amplitude, and the ninth array element excitation being the array element excitation of the conformal array after the second correction.

FIG. 2 is a flowchart illustrating an exemplary process of a method for obtaining a first array element excitation according to some embodiments of the present disclosure. As shown in FIG. 2, the process 200 includes the following steps:

In step 210, obtaining a far-field pattern of the conformal array based on relevant parameters of the array elements.

Figure 7:
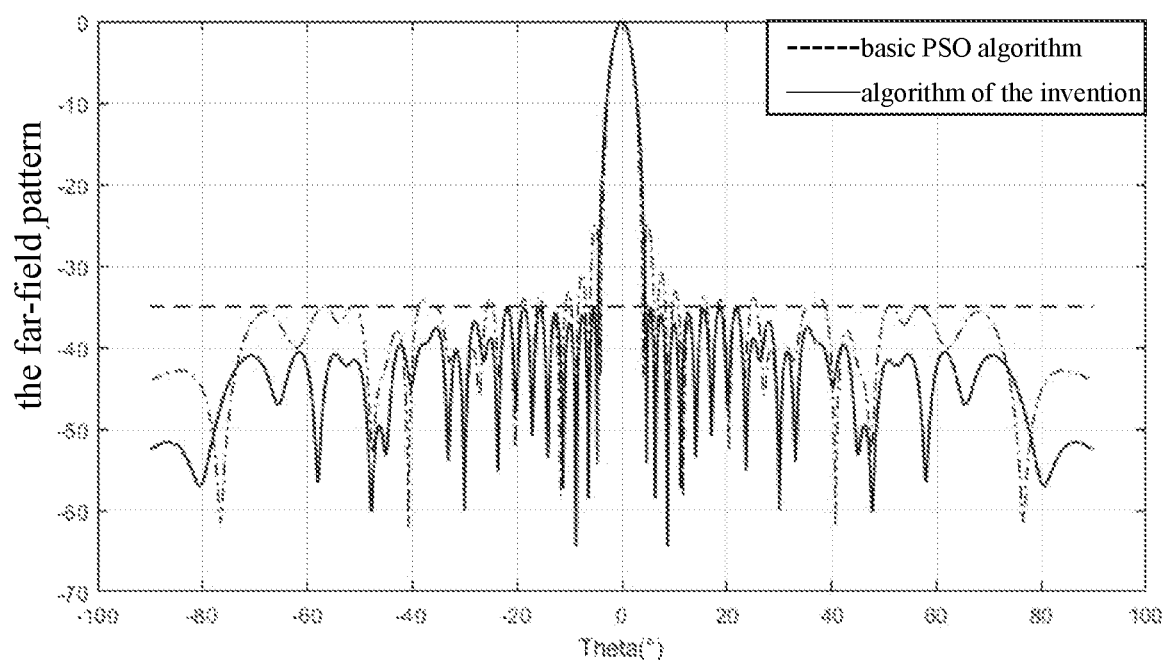
FIG. 7 is a comparison diagram of far-field patterns optimized by a pattern generation algorithm and a basic PSO according to some embodiments of the present disclosure.

A first null may refer to first minimum values found from a main beam angle to left side and right side respectively in the far-field pattern of the antenna. The first null maximum width of the main beam $FNMW_e$ may refer to a maximum value of a width between the main beam angle and a first null degree. In some embodiments, the main beam angle may be 0°. In some embodiments, the first null maximum width of the main beam FNMW$_e$ may be set according to the antenna design indexes. For example, as shown in FIG. 7, the first minimum value (i.e. the first null) found from 0° to left side and right side respectively corresponding to θ may be −10° and 10° respectively, so the first null maximum width of the main beam FNMW$_e$ may be determined to be 10°, that is, the first null width of the main beam may be limited within 10°.

The expected null positions NULL$_{point_e}$ and the null depths NULL$_{value_e}$ may refer to that it is expected to have a null with a particularly small value in a certain direction or a certain angle to avoid interference in the antenna design, where the direction or the angle of the null may be the expected null position NULL$_{point_e}$, and a null value may be the expected null depth NULL$_{value_e}$. In some embodiments, the expected null position NULL$_{point_e}$ and the null depth NULL$_{value_e}$ may be set according to the antenna design indexes. For example, the expected null position NULL$_{pointe}$ may be set as 60°, the expected null depth NULL$_{value_e}$ may be set as −60 dB, that is, a null of −60 dB may be generated at 60°.

In some embodiments, the optimization objectives may be set according to the antenna design indexes, which includes a suppression index of a peak SLL in a normalized far-field pattern, the first null maximum width of the main beam FNMW$_e$, the expected null position NULL$_{point_e}$, and the expected null depth NULL$_{value_e}$.

For example, the optimization objectives may be set as follows according to the antenna design indexes: the suppression index of the peak SLL as −35 dB, the first null maximum width of the main beam FNMW$_e$=10°, the expected null position NULL$_{pointe}$=±30°, and the expected null depth NULL$_{value_e}$=−60 dB. In some embodiments, different optimization objectives may also be set according to the antenna design indexes.

The array elements may refer to radiation elements constituting the antenna array. The conformal array antenna may include multiple array elements.

In some embodiments, the array elements of the conformal array may be set according to practical application requirements. For example, a wavelength λ may be calculated by setting a count of the array elements as N, serial numbers of the array elements as 1~N, a working center frequency as $f$ of the array elements:

$$\lambda = \frac{c}{f} \quad (1)$$

where c=3×10$^8$ m/s, c denotes an electromagnetic wave velocity in vacuum.

In some embodiments, the count of the array elements N may be set based on the practical application requirements of the antenna. For example, if the count of the array elements N may be set as 41, the serial numbers of the array elements may be 1~41.

Figure 4:
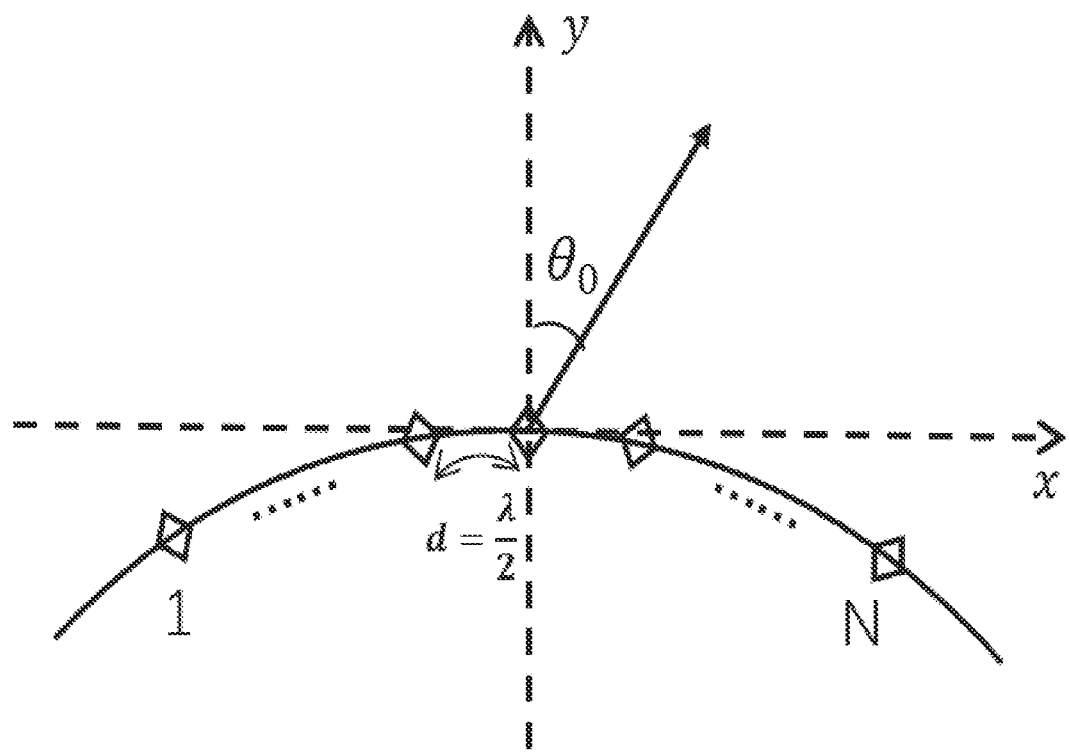
FIG. 4 is a schematic diagram of a conformal array model according to some embodiments of the present disclosure.

In some embodiments, as shown in FIG. 4, a spacing of the array elements may be set as $$\frac{\lambda}{2},$$

a global coordinate system may be established by taking a tangent direction of a symmetrical center point of an array as an x-axis direction and a normal direction of the symmetrical center point of the array as a y-axis direction, and a pattern function $f(θ)$ of each array element among the array elements in a local coordinate system may be converted to a pattern function $f_n(θ)$ of each array element among the array elements in the global coordinate system. In some embodiments, $f_n(θ)=f(θ)*\cos(θ)$. A far-field pattern $F(θ)$ of the conformal array may be calculated by following formula:

$$F(\theta) = \sum_1^N A_n f_n(\theta) \cdot \exp(jk\vec{r_n} \cdot \vec{r}) \quad (2)$$

where $A_n$ is an excitation of a n$^{th}$ array element;

$$k = \frac{2\pi}{\lambda},$$

which is a wavenumber, $\vec{r}$ is a far-field direction of the main beam; $\vec{r_n}$ is a position vector of the n$^{th}$ array element in the global coordinate system; and j represents an imaginary unit.

In step 220, calculating a range of the array element excitation amplitude.

The range of the array element excitation amplitude may refer to a range of excitation amplitude of each array element of the conformal array. In some embodiments, the range of the array element excitation amplitude may be determined based on the DRR of the array element excitation amplitude of the conformal array. For example, a maximum DRR of the array element excitation amplitude of the conformal array may be set as drr=5, and an element excitation A$_n$ may be expressed as:

$$A_n = I_n \cdot \exp(j\alpha_n) \quad (3)$$

where I$_n$ is an excitation amplitude of the n$^{th}$ array element, α$_n$ is an excitation phase of the n$^{th}$ array element, a range of I$_n$ is calculated to be $$\left[\frac{1}{drr}, 1\right],$$

α$_n$=−k$\vec{r_n}$·$\vec{r_0}$, where $\vec{r_0}$ is a position vector of a direction of the main beam in the global coordinate system, the calculation formula of α$_n$ may cause a direction of the far-field pattern of the array as the direction of the main beam.

In step 230: randomly initializing the array element excitation of the conformal array within the range of the array element excitation amplitude.

In some embodiments, the array element excitation of the conformal array may be initialized within the range of the array element excitation amplitude.

In step 240: correcting the array element excitation of the conformal array.

A correction of the array element excitation of the conformal array may refer to performing a correction to the array element excitation based on the DRR of the array element excitation amplitude to cause it satisfying the constraint of the DRR of the array element excitation amplitude.

In some embodiments, the array element excitation of the conformal array may be corrected by the method of steps 310-380.

Figure 3:
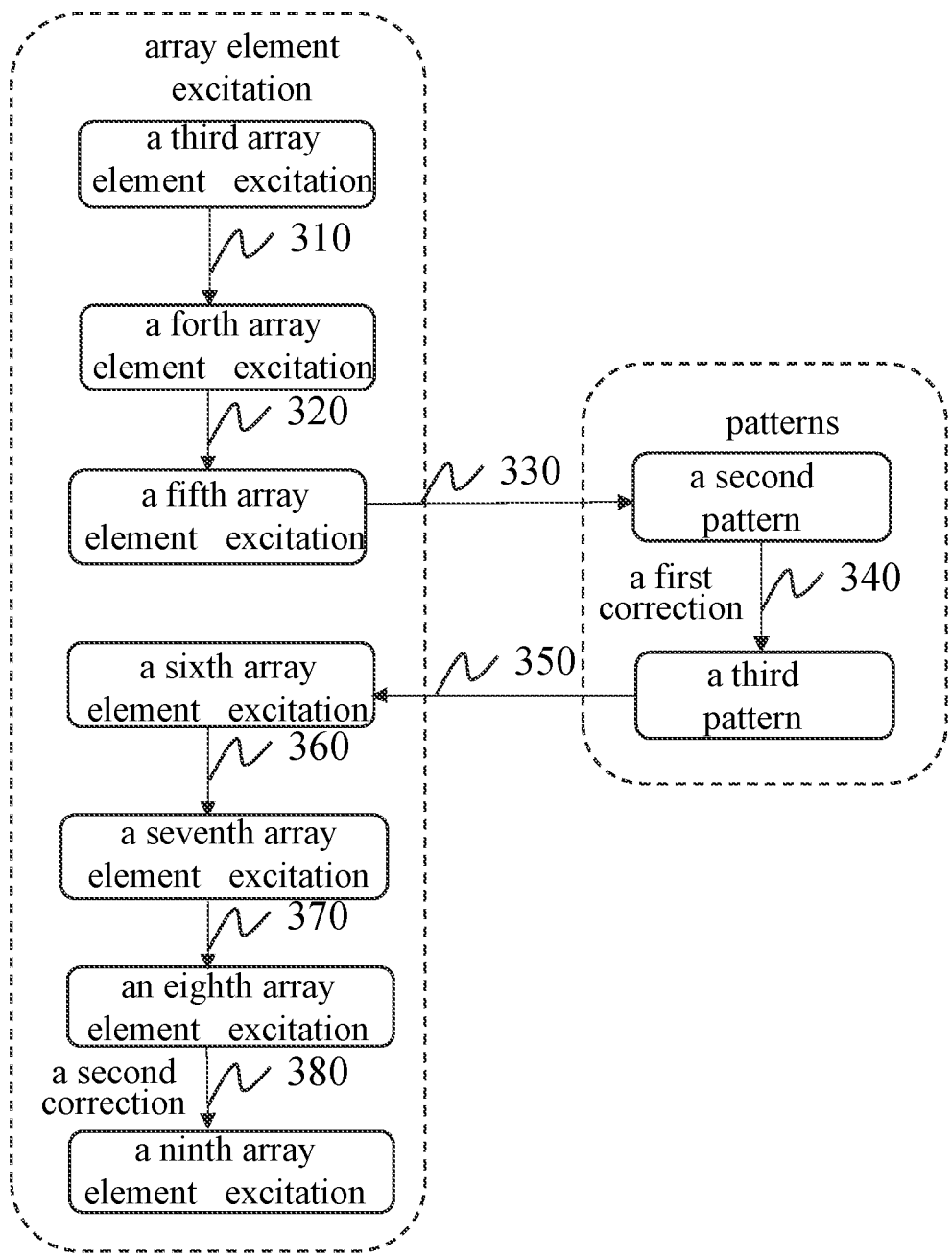
FIG. 3 is a flowchart illustrating an exemplary process of a method for correcting array element excitation of a conformal array according to some embodiments of the present disclosure.

More descriptions regarding the correction of the array element excitation of the conformal array may be found elsewhere in the present disclosure, e.g., FIG. 3 and relevant descriptions thereof.

In step 250, obtaining the first array element excitation satisfying the first index under the constraint of the DRR of the array element excitation amplitude through iterations.

The first index may refer to the suppression index of the peak SLL. The first array element excitation may refer to the array element excitation of the conformal array satisfying the first index. In some embodiments, the array element excitation of the conformal array may be corrected by the iterations based on the DRR of the array element excitation amplitude, and the first array element excitation may be obtained, which satisfies the first index under the constraint of the DRR of the array element excitation amplitude. For example, at least one round of the first iterations may proceed to steps 310-380. If the array element excitation of the conformal array satisfies the DRR of the array element excitation amplitude and the pattern satisfies the suppression index of the peak SLL, the iterations may be stopped, otherwise, a set maximum number of the iterations may be run to obtain the array element excitation of the conformal array satisfying the suppression index of the peak SLL. In some embodiments, the maximum number of iterations may be set according to design requirements. For example, the maximum number of the iterations may be set as 300.

In some embodiments, the at least one round of the first iterations may also include performing multiple rounds of second iterations to update the ninth array element excitation based on the multiple optimization objectives. In some embodiments, a result after the stopping the first iterations may be taken as a final result, or the result may be processed subsequent.

In some embodiments, the at least one round of the second iterations may also include: calculating a particle fitness, updating an individual optimal value and a global optimal value of population; obtaining current values of the particles, and calculating and updating positions and speeds of the particles based on a relationship between the current values of the particles and the individual optimal value, as well as the current values of the particles and the global optimal value of the population. In some embodiments, the particle fitness may be related to the multiple optimization objectives. More descriptions regarding the second iterations may be found elsewhere in the present disclosure, e.g., FIG. 6 and relevant descriptions thereof.

In some embodiments, updating the speeds and positions of the particles may include that the round of an earlier first iterations corresponds to a larger inertia weight coefficient. For example, an inertia weight coefficient used in the round 2 of the first iterations may be larger than an inertia weight coefficient used in the round 290 of the first iterations. Thus, a better solution may be approached quickly in an early stage of the first iterations, and the solution has higher accuracy in a later stage.

In some embodiments, the number of iterations of the second iterations may be set based on the practical calculation requirements. In some embodiments, a number range of the second iterations may be [5, 10].

The second iterations may be used crossly in the first iterations, which may cause the overall solution process more balanced, reduce oscillation, and obtain better results faster.

It should be noted that the above descriptions of the process 200 is only for example and explanation, and not limit the scope of application of the present disclosure. For those skilled in the art, various modifications and changes may be made to the process 200 under the guidance of the present disclosure. However, these amendments and changes are still within the scope of the present disclosure.

FIG. 3 is a flowchart illustrating an exemplary process of a method for correcting array element excitation of a conformal array according to some embodiments of the present disclosure. As shown in FIG. 3, the process 300 includes the following steps:

In step 310, obtaining a fourth array element excitation from a conversion of a third array element excitation based on an excitation conversion relationship between the conformal array and the projection array, the third array element excitation being the array element excitation of the conformal array, and the fourth array element excitation being the array element excitation of the projection array.

The projection array may refer to an array obtained by projecting the conformal array. In some embodiments, the conformal array may be projected in the direction of the main beam to obtain the projection array. In some embodiments, the direction of the main beam may be any angular direction, for example, the direction of the main beam may be set as $\theta_0=0°$, $\theta_0=90°$, $\theta_0=-90°$, etc.

Figure 5:
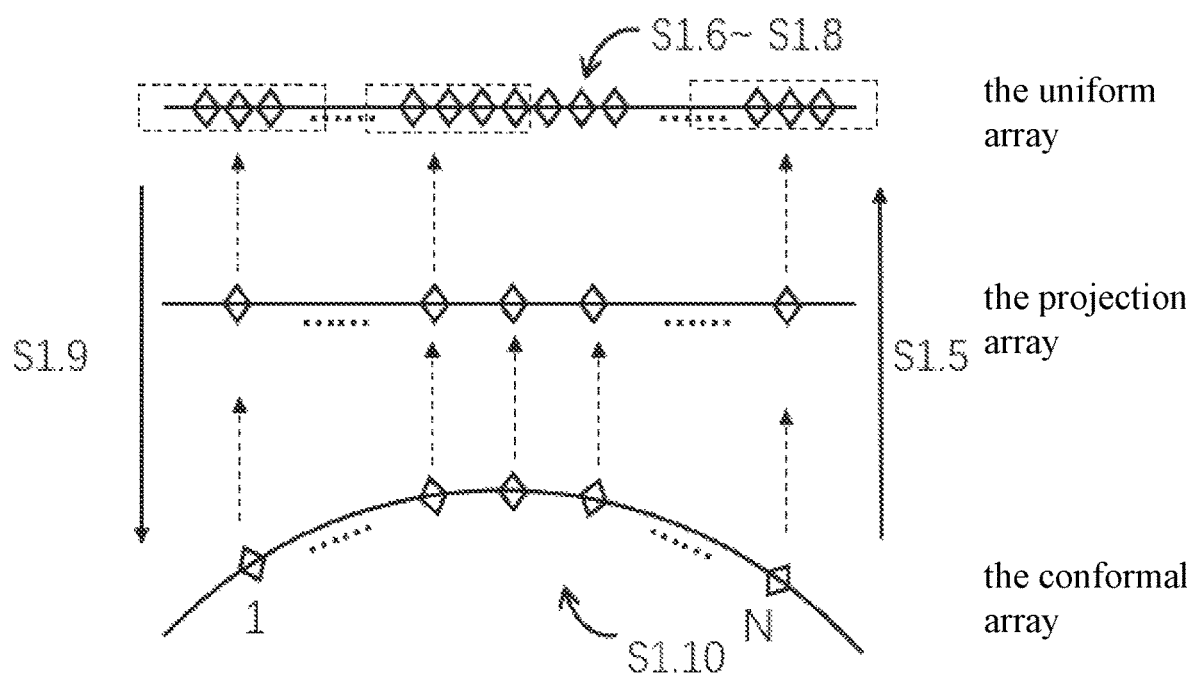
FIG. 5 is a schematic diagram of the method for correcting the array element excitation of the conformal according to some embodiments of the present disclosure.

In some embodiments, the fourth array element excitation may be obtained from the conversion of the third array element excitation based on the excitation conversion relationship between the conformal array and the projection array. The third array element excitation may be the array element excitation of the conformal array and the fourth array element excitation may be the array element excitation of the projection array. In some embodiments, the excitation conversion relationship between the conformal array and the projection array may be obtained by the following method:

The direction of the main beam $\theta_0=0°$ is set as a y-axis direction of the global coordinate system, and the projection array is obtained by projecting the conformal array in the direction of the main beam. As shown in FIG. 5, wherein x-axis coordinates of the array elements of the projection array are equal to that of corresponding array elements of the conformal array, and the y-axis coordinate is 0; based on an approximately equal peak SLL relationship, calculating the excitation conversion relationship between the projection array and the conformal array by the following formula:

$$I_{pn} = \frac{I_n \cdot |f_n(\theta_0)|}{|f(\theta_0)|} \tag{4}$$

where $I_{pn}$ is an excitation amplitude of the $n^{th}$ array element of the projection array; $|f_n(\theta_0)|$ is an array element pattern amplitude of the $n^{th}$ array element of the conformal array in the direction of the main beam; $|f(\theta_0)|$ is an array element pattern amplitude of the projection array in the direction of the main beam.

In step 320, obtaining a fifth array element excitation from a conversion of the fourth array element excitation based on an excitation conversion relationship between the projection array and the uniform array, and the fifth array element excitation being an array element excitation of the uniform array.

The uniform array may refer to an array with uniform spacing obtained by interpolating the projection array. In some embodiments, the projection array with non-uniform spacing may be interpolated according to a smaller spacing and converted into the uniform array with the smaller spacing. In some embodiments, the smaller spacing may be smaller than the non-uniform spacing of the projection array. As shown in FIG. 5, array element of each projection array may be represented by a section of array element of the uniform array centered on the array element of each projection array. The pattern may be a product of an array element excitation matrix and a guidance vector matrix.

In some embodiments, when a far-field pattern of the projection array is equal to a far-field pattern of the uniform array, a least square relationship may be established based on the guidance vector matrix of the projection array and the guidance vector matrix of the uniform array:

$$\min_{c} \|E_e E_C - E_p\|_2^2 \quad (12)$$

where $E_p$ is a guidance vector matrix of the projection array, $E_e$ is a guidance vector matrix of the uniform array, an excitation conversion relationship matrix $E_C$ between the projection array and the uniform array may be obtained based on a variation of the above formula:

$$E_C = (E_e^H E_e)^{-1} E_e^H E_p \quad (5)$$

where $E_C$ is a conversion matrix satisfying the least square relationship, and $E_e^H$ represents a conjugate transpose of $E_e$.

In some embodiments, the fifth array element excitation may be obtained from a conversion of the fourth array element excitation based on the excitation conversion relationship between the projection array and the uniform array, and the fifth array element excitation may be the array element excitation of the uniform array.

In step 330, obtaining array factors by calculating the fifth array element excitation using the IFFT, and obtaining a second pattern by multiplying the array factors by the first pattern, the first pattern being an array element pattern, and the second pattern being a far-field pattern corresponding to the uniform array.

The far-field pattern corresponding to the uniform array may be disassembled into a form of the array element pattern multiplied by the array factors. In some embodiments, the array factors may be calculated by the IFFT based on the fifth array element excitation, the second pattern may be obtained by correcting the array factors by the first pattern, the first pattern may be the array element pattern obtained from the step 210, and the second pattern may be the far-field pattern corresponding to the uniform array. Compared with a traditional pattern calculation formula, the above method uses FFT, which has low complexity, fast calculation, and little impact on the overall calculation of the algorithm, so the S1 is suitable as a pre step of the S2.

In step 340, determining a third pattern by performing a first correction to the second pattern based on the first index.

The first correction may refer to a correction of values of sampling points of the far-field pattern to obtain the values of the sampling points satisfying the first index, that is, the SLL of the far-field pattern may be suppressed below the suppression index of the peak SLL. In some embodiments, the third pattern may be obtained by performing the first correction to the second pattern based on the first index. For example, a corrected far-field pattern of the uniform array may be obtained by correcting the far-field pattern of the uniform array according to the suppression index of the peak SLL and correcting the values of the pattern sampling points exceeding the suppression index of the peak SLL to values satisfying the suppression index of the peak SLL. In some embodiments, the suppression index of the peak SLL may be set based on the design index. For example, the suppression index of the peak SLL may be −15 dB, −20 dB, −35 dB, etc.

In step 350, obtaining the array factors by dividing the third pattern by the first pattern, and calculating the sixth array element excitation based on the array factors through the FFT, the sixth array element excitation being the array element excitation of the uniform array after the first correction.

In some embodiments, the array factors may be obtained by dividing the third pattern by the first pattern, the array factors may be used to calculate the sixth array element excitation through the FFT, and the sixth array element excitation may be the array element excitation of the uniform array after the first correction.

In step 360, obtaining the seventh array element excitation from a conversion of the sixth array element excitation based on the excitation conversion relationship between the projection array and the uniform array, and the seventh array element excitation being the array element excitation of the projection array after the first correction.

In some embodiments, the seventh array element excitation may be obtained from the conversion of the sixth array element excitation based on the excitation conversion relationship between the projection array and the uniform array, and the seventh array element excitation may be the array element excitation of the projection array after the first correction. For example, the seventh array element excitation may be obtained by inversing the sixth array element excitation according to the formula (5). More descriptions regarding the excitation conversion relationship between the projection array and the uniform array may be found elsewhere in the present disclosure, e.g., step 320 and relevant descriptions thereof.

In step 370, obtaining the eighth array element excitation from the conversion of the seventh array element excitation based on the excitation conversion relationship between the conformal array and the projection array, and the eighth array element excitation being the array element excitation of the conformal array after the first correction.

In some embodiments, the eighth array element excitation may be obtained from the conversion of the seventh array element excitation based on the excitation conversion relationship between the conformal array and the projection array, and the eighth array element excitation may be the array element excitation of the conformal array after the first correction. For example, the eighth array element excitation may be obtained by inversing the seventh array element excitation according to the formula (4). More descriptions regarding the excitation conversion relationship between the array element excitation of the conformal array and the array element excitation of the projection array may be found elsewhere in the present disclosure, e.g., step 310 and relevant descriptions thereof.

In step 380, determining a ninth array element excitation by performing a second correction to the eighth array element excitation based on a range of the array element excitation amplitude, the ninth array element excitation being the array element excitation of the conformal array after the second correction.

The second correction may refer to a correction of the eighth array element excitation based on the range of the array element excitation amplitude. In some embodiments, the ninth array element excitation may be determined by performing the second correction to the eighth array element excitation based on the range of the array element excitation amplitude, and the ninth array element excitation may be the eighth array element excitation after the second correction. For example, the eighth array element excitation may be corrected according to the range of the array element excitation amplitude $$\left[\frac{1}{drr}, 1\right]$$

to cause it satisfying the constraint of the DRR of the array element excitation amplitude.

In some embodiments, the performing the second correction to the eighth array element excitation based on the range of the array element excitation amplitude may include: normalizing the eighth array element excitation, and increasing the value of the normalized eighth array element excitation less than $$\frac{1}{drr}.$$

Based on the excitation conversion relationship among the conformal array, the projection array, and the uniform array, the conformal array may be converted into the uniform array. The far-field pattern of the uniform array may be corrected by using characteristics that the far-field pattern of the uniform array satisfies the product law to obtain the far-field pattern satisfying the suppression index of the peak SLL. The array factors may be obtained based on the IFFT between the uniform array and the array factors. The product of the array factors and the array element pattern may be the far-field pattern. Compared with a traditional pattern calculation method, the process adopts Fourier transform, which has low complexity, fast calculation, and little impact on the overall calculation of the algorithm. The array element excitation of the uniform array may be obtained based on the far-field pattern satisfying the suppression index of the peak SLL, and then the array element excitation of the conformal array may be obtained based on the excitation conversion relationship, and the array element excitation of the conformal array may be corrected to cause it satisfying the constraint of the DRR of the array element excitation amplitude. The array element excitation of the conformal array satisfying the suppression index of the peak SLL under the constraint of the DRR of the array element excitation amplitude may be obtained through the multiple iterations.

It should be noted that the above descriptions of the process 300 are only for example and explanation, and not limit the scope of application of the present disclosure. For those skilled in the art, various corrections and changes can be made to the process 300 under the guidance of the present disclosure. However, these amendments and changes are still within the scope of the present disclosure.

In some embodiments, according to the first array element excitation, the obtaining the second array element excitation satisfying multiple optimization objectives under the constraint of the DRR of the array element excitation amplitude by the solution algorithm may include: randomly initializing the positions and speeds of particles in the solution space, the solution of the solution space being the array element excitation of the conformal array satisfying the multiple optimization objectives, the particle being potential solution in the solution space, and using particles satisfying the preset conditions as the second array element excitation based on the multiple iterations, and at least one round of iterations including: calculating the particle fitness, updating the individual optimal value and the global optimal value of the population; obtaining current value of the particles, and calculating and updating the speeds and positions of the particles based on the relationship between the current values of the particles and the individual optimal value, as well as the current values of the particles and the global optimal value of the population.

FIG. 6 is a flowchart illustrating an exemplary process of a method for obtaining a second array element excitation according to some embodiments of the present disclosure. As shown in FIG. 6, the process 600 includes the following steps:

In some embodiments, the solution space of the PSO may be pruned based on the first array element excitation, and nonlinear updated weight coefficients may be designed for ensuring sufficient global search, a fitness function may be designed according to the multiple optimization objectives for further optimizing a conformal array pattern, so as to obtain the array element excitation of the conformal array satisfying the multiple optimization objectives under the constraint of the DRR of the array element excitation amplitude.

In step 610, determining an initialization value range of the particles based on a first array element excitation and a range of the array element excitation amplitude.

The PSO is a method for finding a better solution in N-dimensions space. The candidate solution may be simulated by massless particles, and the position of particle i in the N-dimensions space may be expressed as vector $X_i=(x_1, x_2, \ldots, x_N)$. Particles moving in the N-dimensions space have two attributes of speed and position, the speed represents a speed of movement and the position represents a direction of movement. Each particle may have a fitness value determined by a target function to judge the current position. The PSO may update the speed based on each particle's best position, current position $X_i$, and the best positions of all particles in the whole group, and find a better solution through multiple iterations. The best position of all particles in the whole group may be the best value among the best positions found so far.

In the POS, particles start from random solutions, search in the solution space, and find the individual optimal value and global optimal value through iterations. The solution space refers to a set of potential solutions. Particles are potential solutions in the solution space.

A solution space pruning may refer to reducing a value range of particles in the solution space. In some embodiments, particles may search all or part of the solution space. In some embodiments, the initialization value range of the particles may be determined based on the first array element excitation and the range of the array element excitation amplitude. In some embodiments, the solution space may be reasonably pruned based on the first array element excitation and the range of array element excitation amplitude to determine the initialization value range of the particles. For example, the solution space may be pruned as follows.

Each dimension of the particles in the solution space may correspond to the array element excitation of the conformal array. A search range of the solution space in the dimension i may be determined as follows:

$$X_i^L = \max\left(X_i^{init} - \sigma, \frac{1}{drr}\right) \quad (6)$$

$$X_i^U = \min(X_i^{init} + \sigma, 1) \quad (7)$$

where $X_i^L$ is a lower limit of search range of the particles in the $i^{th}$ dimension, $X_i^U$ is an upper limit of the search range of the particles in the $i^{th}$ dimension, $X^{init}$ is a vector formed by the array element excitation of the conformal array obtained from the S1, dimensions of $X^{init}$ are equal to the count of the array element of the conformal array, $X_i^{init}$ is a $i^{th}$ dimension of the $X^{init}$, $\sigma$ is a pruning factor of the solution space, which represents a range of the solution space reserved near the array element excitation of the conformal array obtained from the S1. This formula may determine the solution space range of particle search under the constraint of the DRR of the array element excitation amplitude.

The particles may search in a narrower range by pruning the solution space reasonably, which is conducive to accelerate the convergence of the algorithm, improve the convergence accuracy, and make the operation more stable.

In step 620, randomly initializing positions and speeds of the particles in the solution space.

In some embodiments, initial positions and speeds of the particles may be obtained by randomly initializing particles in the pruned solution space determined from the step 610.

In step 630, calculating a particle fitness and updating an individual optimal value and a global optimal value of population.

In some embodiments, the individual optimal value and the global optimal value of the population may be updated by calculating the particle fitness. In some embodiments, the particle fitness may be calculated using the following formula:

$$\text{fitness} = \mu_1 \cdot \text{sll}_{total} + \mu_2 \cdot \max((FNMW - FNMW_e), 0) + \mu_3 \cdot (10 \cdot |NULL_{point} - NULL_{point_e}| + |NULL_{value} - NULL_{value_e}|) \quad (8)$$

where $\text{sll}_{total}$ is a sum of values of the pattern sampling points higher than the suppression index of the peak SLL in values of all pattern sampling points; FNMW and $FNMW_e$ are an actual value and an expected value of the first null beam width; $NULL_{point}$ and $NULL_{point_e}$ are an actual value and an expected value of the null position; $NULL_{value}$ and $NULL_{value_e}$ are an actual value and an expected value of a null value; $\mu_1$, $\mu_2$, $\mu_3$ are weight coefficients for adjusting search effect. In some embodiments, $\mu_1$, $\mu_2$, $\mu_3$ may be set based on actual computing requirements. In some embodiments, $\mu_1 = 0.1$, $\mu_2 = 0.5$, $\mu_3 = 0.4$.

In step 640, obtaining current values of the particles, and calculating and updating the positions and speeds of the particles based on a relationship between the current values of the particles and the individual optimal value, as well as the current values of the particles and the global optimal value of the population.

In some embodiments, the current values of the particles may be obtained and the positions and speeds of the particles may be calculated and updated based on the relationship between the current values of the particles and the individual optimal value, as well as the current values of the particles and the global optimal value of the population. In some embodiments, the positions and speeds of the particles may be calculated and updated by the following formula:

$$V_{id}^k = \omega V_{id}^{k-1} + c_1 r_1 (\text{pbest}_{id} - X_{id}^{k-1}) + c_2 r_2 (\text{gbest}_d - X_{id}^{k-1}) \quad (9)$$

$$X_{id}^k = X_{id}^{k-1} + V_{id}^{k-1} \quad (10)$$

where $\omega$ is an inertia weight coefficient, $c_1$ and $c_2$ are acceleration factors; $r_1$ and $r_2$ are random numbers satisfying a uniform distribution within (0, 1); $\text{pbest}_{id}$ is the $i^{th}$ dimension of the individual optimal value of particle d; $\text{gbest}_i$ is the $i^{th}$ dimension of the global optimal value, $V_{id}^k$ is a velocity of the particles in the $i^{th}$ dimension during a $k^{th}$ iteration, $X_{id}^k$ is a position of the particles in the $i^{th}$ dimension during the $k^{th}$ iteration.

In step 650, updating the inertia weight coefficient.

In some embodiments, the at least one round of iterations may also include updating the inertia weight coefficient. In some embodiments, the inertia weight coefficient $\omega$ may be updated in a variety of ways. In some embodiments, the inertia weight coefficient $\omega$ may be updated nonlinearly. For example, the inertia weight coefficient $\omega$ may be updated nonlinearly according to the following formula:

$$\omega = \left(1 - \left(\frac{k}{T}\right)^3\right) \cdot \omega_r + \omega_0 \quad (11)$$

wherein k is a current number of the iterations, T is a maximum number of the iterations, $\omega_r$ is a scaling factor of a range of $\omega$, $\omega_0$ is a minimum value of the range of $\omega$, $\omega_r$ and $\omega_0$ may adjust the range of $\omega$. Since the solution space has been pruned, the inertia weight coefficient $\omega$ may be updated nonlinearly according to the formula (12) so that the particle search may be a small-scale fine search to ensure sufficient global search.

In step 660, taking the particles satisfying preset conditions as a second array element excitation.

A solution of the solution space may refer to the array element excitation of the conformal array satisfying the multiple optimization objectives. A particle may be a potential solution in the solution space. In some embodiments, the particles may perform sufficient global search in the solution space based on nonlinear update of the inertia weight coefficient, and the particles satisfying the preset conditions may be obtained as the solution of the solution space through the multiple iterations, i.e., the second array element excitation. In some embodiments, a maximum number of the iterations may be set according to practical calculation requirements. For example, the maximum number of the iterations T may be set as 500.

The particles may search in a narrower range by pruning the solution space reasonably. At the same time, the nonlinear update of the inertia weight coefficient may be designed to ensure that the particles may perform sufficient and fine global search in a narrower range and remedy the deficiency that the existing algorithms are easy to fall into local convergence.

It should be noted that the above descriptions of the process 600 are only for example and explanation, and not limit the scope of application of the present disclosure. For those skilled in the art, various corrections and changes may be made to the process 600 under the guidance of the present disclosure. However, these amendments and changes are still within the scope of the present disclosure.

Figure 10:
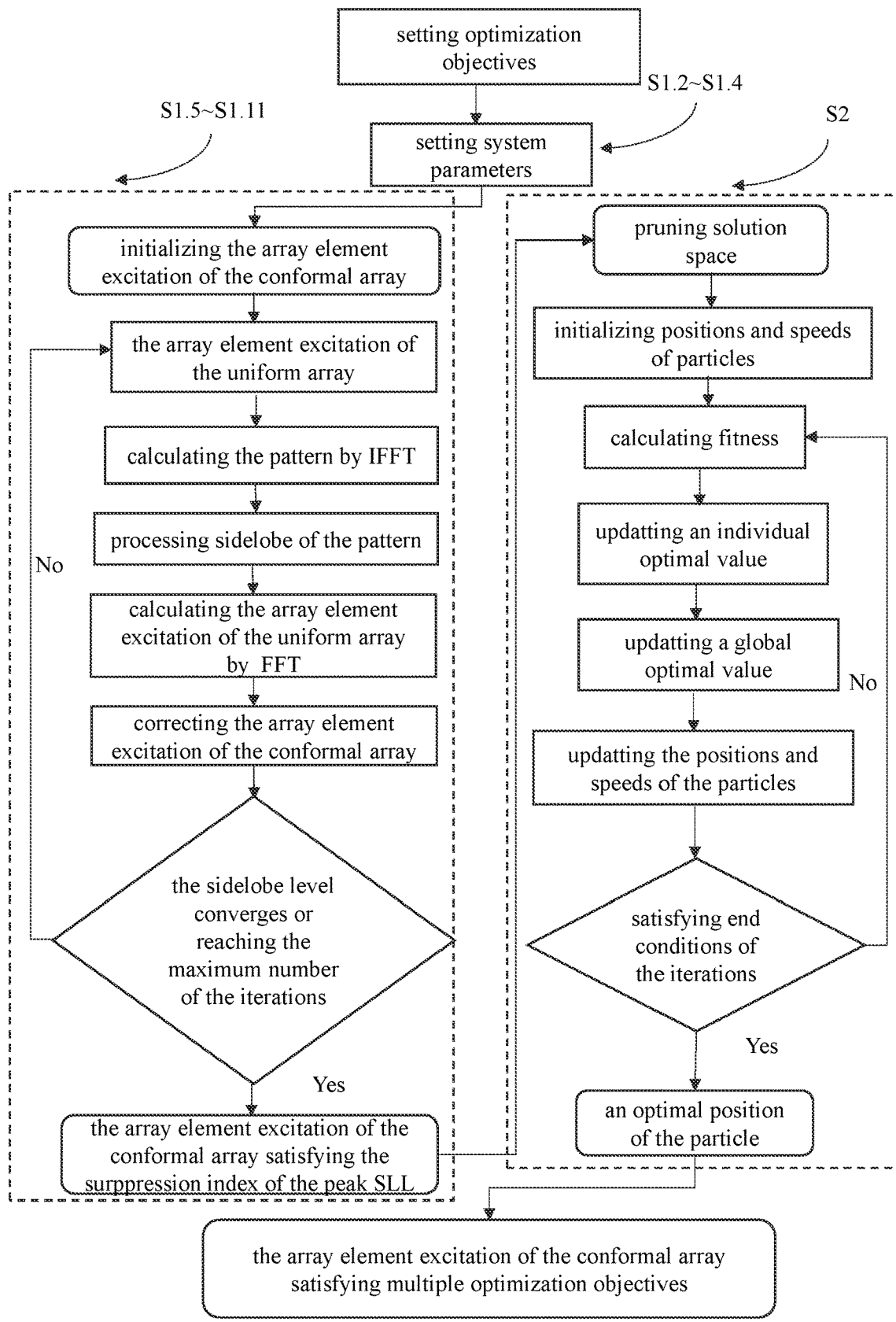
FIG. 10 is a flowchart illustrating an exemplary process of a method for conformal array pattern synthesis based on solution space pruning particle swarm optimization algorithm (PSO) according to another embodiments of the present disclosure.

In some embodiments, the method for conformal array pattern synthesis based on solution space pruning PSO, as shown in FIG. 10, the method may include the following steps:

S1: taking a suppression index of a peak SLL as an only index, realizing an array element excitation conversion between a conformal array and a uniform array based on an excitation conversion relationship between a projection array and the conformal array as well as a least square relationship between array element excitation of the projection array and array element excitation of the uniform array, and calculating and processing a pattern quickly by an IFFT and a FFT to obtain an array element excitation of the conformal array satisfying the suppression index of the peak SLL under a constraint of a DRR of array element excitation amplitude, wherein the S1 may be realized by the following sub steps:

S1.1: setting the multiple optimization objectives according to design indexes, the multiple optimization objectives including a suppression index of a peak SLL in a normalized far-field pattern as −35 dB, the first null maximum width of the main beam $FNMW_e = 10°$, the expected null position $NULL_{point_e} = \pm 30°$, and the null depth $NULL_{value_e}$ −60 dB.

S1.2: setting a count of array elements N=41, serial numbers of the array elements as 1~41, a working center frequency of array elements as $f$:

$$\lambda = \frac{c}{f} \quad (1)$$

where $c = 3 \times 10^8$ m/s, c denotes an electromagnetic wave velocity in vacuum.

Setting a spacing of the array elements as $$\frac{\lambda}{2},$$

establishing a global coordinate system by taking a tangent direction of a symmetrical center point of an array as an x-axis direction and a normal direction of the symmetrical center point of the array as a y-axis direction, converting a pattern function $f(\theta)$ of each array element among the array elements in a local coordinate system to a pattern function $f_n(\theta)$ of each array element among the array elements in the global coordinate system, $f_n(\theta) = f(\theta)^*\cos(\theta)$, and calculating a far-field pattern $F(\theta)$ of the conformal array:

$$F(\theta) = \sum_{1}^{N} A_n f_n(\theta) \cdot \exp(jk\vec{r_n} \cdot \vec{r}) \quad (2)$$

where $A_n$ is an excitation of a $n^{th}$ array element;

$$k = \frac{2\pi}{\lambda},$$

which is a wavenumber; $\vec{r}$ is a far-field direction of the main beam; $\vec{r_n}$ is a position vector of the $n^{th}$ array element in the global coordinate system; and j represents an imaginary unit.

S1.3: setting a maximum DRR of the array element excitation amplitude of the conformal array as drr=5, and expressing element excitation $A_n$ as:

$$A_n = I_n \cdot \exp(j\alpha_n) \quad (3)$$

where $I_n$ is an excitation amplitude of the $n^{th}$ array element, $\alpha_n$ is an excitation phase of the $n^{th}$ array element, calculating a range of $I_n$ to be $$\left[\frac{1}{drr}, 1\right],$$

$\alpha_n = -k\vec{r_n} \cdot \vec{r_0}$, where $\vec{r_0}$ is a position vector of a direction of the main beam in the global coordinate system.

Figure 8:
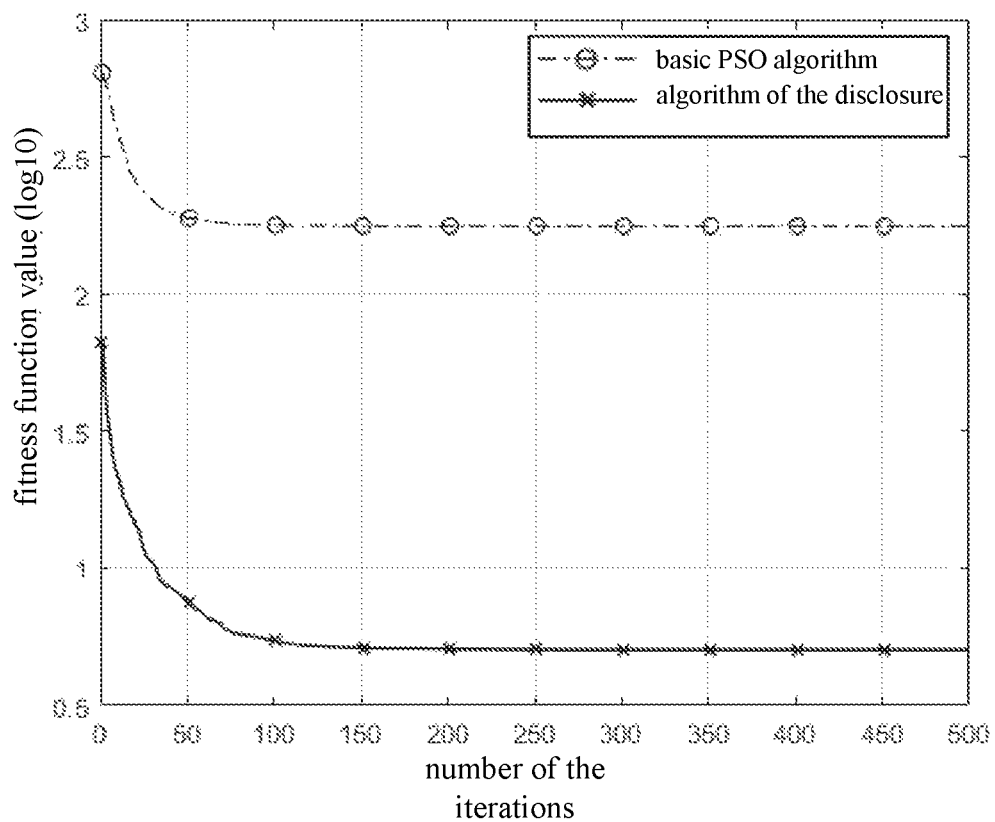
FIG. 8 is a comparison diagram of optimal fitness values optimized by the pattern generation algorithm and the basic PSO algorithm according to some embodiments of the present disclosure.

S1.4: randomly initializing the array element excitation of the conformal array within the range of the excitation amplitude determined by the S1.3;

S1.5: setting the direction of the main beam as $\theta_0 = 0°$, the direction of the main beam is a y-axis direction of the global coordinate system, projecting the conformal array in the direction of the main beam to obtain the projection array; as shown in FIG. 8, wherein x-axis coordinates of the projection array elements are equal to that of corresponding conformal array elements, and a y-axis coordinate is 0; based on an approximately equal peak SLL relationship, calculating the excitation conversion relationship between the projection array and the conformal array by the following formula:

$$I_{pn} = \frac{I_n \cdot |f_n(\theta_0)|}{|f(\theta_0)|} \quad (4)$$

where $I_{pn}$ is an excitation amplitude of the $n^{th}$ array element of the projection array; $|f_n(\theta_0)|$ is an array element pattern amplitude of the $n^{th}$ array element of the conformal array in the direction of the main beam; $|f(\theta_0)|$ is an array element pattern amplitude of the projection array in the direction of the main beam.

Converting the projection array into the uniform array with a smaller spacing by interpolating the projection array according to the smaller spacing, wherein array element of each projection array is represented by a section of array elements of the uniform array centered on the array element of the projection array element, the pattern is a product of an array element excitation matrix and a guidance vector matrix, when a far-field pattern of the projection array is equal to a far-field pattern of the uniform array, a least square relationship is established based on a guidance vector matrix of the projection array and a guidance vector matrix of the uniform array:

$$\min_{c} \|E_e E_C - E_p\|_2^2 \quad (12)$$

where $E_p$ is a guidance vector matrix of the projection array, $E_e$ is a guidance vector matrix of the uniform array, an excitation conversion relationship matrix $E_C$ between the projection array and the uniform array is obtained based on a variation of the above formula:

$$E_C = (E_e^H E_e)^{-1} E_e^H E_p \quad (5)$$

where $E_C$ is a conversion matrix satisfying the least square relationship, $E_e^H$ represents a conjugate transpose of $E_e$.

S1.6: obtaining a far-field pattern of the uniform array, which is a product of an array factor and an array element pattern obtained from the S1.2, wherein the array factor is calculated according to an inverse Fourier transform between the uniform array and the array factor. Compared with traditional pattern calculation formula, this method uses fast Fourier transform, which has low complexity and fast calculation, and has little impact on the overall calculation of the algorithm, so the S1 is suitable as the pre step of the S2.

S1.7: according to the suppression index of the peak SLL, correcting a value of the pattern sampling point exceeding the suppression index of the peak SLL to a value satisfying the suppression index of the peak SLL, that is, the SLL of the pattern is suppressed below the suppression index of the peak SLL.

S1.8: obtaining the array factor by dividing a corrected pattern by the array element pattern, and obtaining array element excitation of the uniform array by Fourier transform;

S1.9: obtaining the array element excitation of the conformal array by inverse operation of the formulas (4) and (6);

S1.10: according to the range of the array element excitation amplitude being $$\left[\frac{1}{drr}, 1\right],$$

correcting the array element excitation of the conformal array to cause it satisfying the constraint of the DRR of the array element excitation amplitude.

S1.11: iteratively performing S1.5-S1.10, if the array element excitation of the conformal array satisfies the DRR of the array element excitation amplitude and the pattern satisfies the suppression index of the peak SLL, stopping the iterations, otherwise, running to a set maximum number of the iterations to obtain the array element excitation of the conformal array satisfying the suppression index of the peak SLL.

S2: according to the array element excitation of the conformal array obtained by the S1, pruning a solution space of the PSO, designing a nonlinear updated weight coefficient to ensure sufficient global search, designing a fitness function according to the multiple optimization objectives, and further optimizing the conformal array pattern to obtain the array element excitation of the conformal array satisfying the multiple optimization objectives under the constraint of the DRR of the array element excitation amplitude;

The S2 may be realized by the following sub steps:

S2.1: based on the array element excitation of the conformal array obtained from S1 and the range of the array element excitation amplitude of $$\left[\frac{1}{drr}, 1\right]$$

obtained from the S1.3, pruning the solution space reasonably, each dimension of the particles in the solution space corresponding to one array element excitation of the conformal array, determining a search range of the solution space in a $i^{th}$ dimension as follows:

$$X_i^L = \max\left(X_i^{init} - \sigma, \frac{1}{drr}\right) \quad (6)$$

$$X_i^U = \min(X_i^{init} + \sigma, 1) \quad (7)$$

where $X_i^L$ is a lower limit of search range of the particles in the $i^{th}$ dimension, $X_i^U$ is an upper limit of the search range of the particles in the $i^{th}$ dimension, $X^{init}$ is a vector formed by the array element excitation of the conformal array obtained from the S1, dimensions of the $X^{init}$ are equal to the count of the array element of the conformal array, $X_i^{init}$ is a $i^{th}$ dimension of the $X^{init}$, $\sigma$ is a pruning factor of the solution space, which represents a range of the solution space reserved near the array element excitation of the conformal array obtained from the S1. This formula may determine the solution space range of particle search under the constraint of the DRR of the array element excitation amplitude.

S2.2: randomly initializing positions and speeds of the particles in the solution space after pruning.

S2.3: calculating a particle fitness according to following formula, and updating an individual optimal value and a global optimal value of population:

$$f = \mu_1 \cdot sll_{total} + \mu_2 \cdot \max((FNMW - FNMW_e), 0) + \mu_3 \cdot (10 \cdot |NULL_{point} - NULL_{point_e}| + |NULL_{value} - NULL_{value_e}|) \quad (8)$$

where $sll_{total}$ is a sum of values of the pattern sampling points higher than the suppression index of the peak SLL in values of all pattern sampling points; FNMW and $FNMW_e$ are an actual value and an expected value of the first null beam width; $NULL_{point}$ and $NULL_{point_e}$ are an actual value and an expected value of the null position; $NULL_{value}$ and $NULL_{value_e}$ are an actual value and an expected value of a null value; $\mu_1$, $\mu_2$, and $\mu_3$ are weight coefficients for adjusting search effect. In some embodiments, $\mu_2=0.1$, $\mu_2=0.5$, $\mu_3=0.4$.

S2.4: calculating and updating the positions and speeds of the particles by following formulas:

$$V_{id}^k = \omega V_{id}^{k-1} + c_1 r_2(pbest_{id} - X_{id}^{k-1}) + c_2 r_2(gbest_d - X_{id}^{k-1}) \quad (9)$$

$$X_{id}^k = X_{id}^{k-1} + V_{id}^{k-1} \quad (10)$$

where $\omega$ is an inertia weight coefficient, $c_1$ and $c_2$ are acceleration factors; $r_1$ and $r_2$ are random numbers satisfying a uniform distribution within a range of [0, 1]; $pbest_{id}$ is the individual optimal value; $gbest_d$ is the global optimal value, $V_{id}^k$ is a velocity of the particles in the $i^{th}$ dimension during a $k^{th}$ iteration, $X_{id}^k$ is a position of the particles in the $i^{th}$ dimension during the $k^{th}$ iteration.

S2.5: in order to emphasize sufficient global search during a search process, updating nonlinearly the inertia weight coefficient $\omega$ by following formula:

$$\omega = \left(1 - \left(\frac{k}{T}\right)^3\right) \cdot \omega_r + \omega_0 \quad (11)$$

where k is a current number of the iterations, T is a maximum number of the iterations, $\omega_r$ is a scaling factor of a range of $\omega$, $\omega_0$ is a minimum value of the range of $\omega$, $\omega_r$ and $\omega_0$ may realize adjustment of value range of $\omega$.

S2.6: in this embodiment, the maximum number of the iterations T is 500, if the maximum number of the iterations is reached, stopping iterations, otherwise turning back the S2.3; finally, obtaining the array element excitation of the conformal array satisfying the optimization objectives set by the S1.1.

Figure 9:
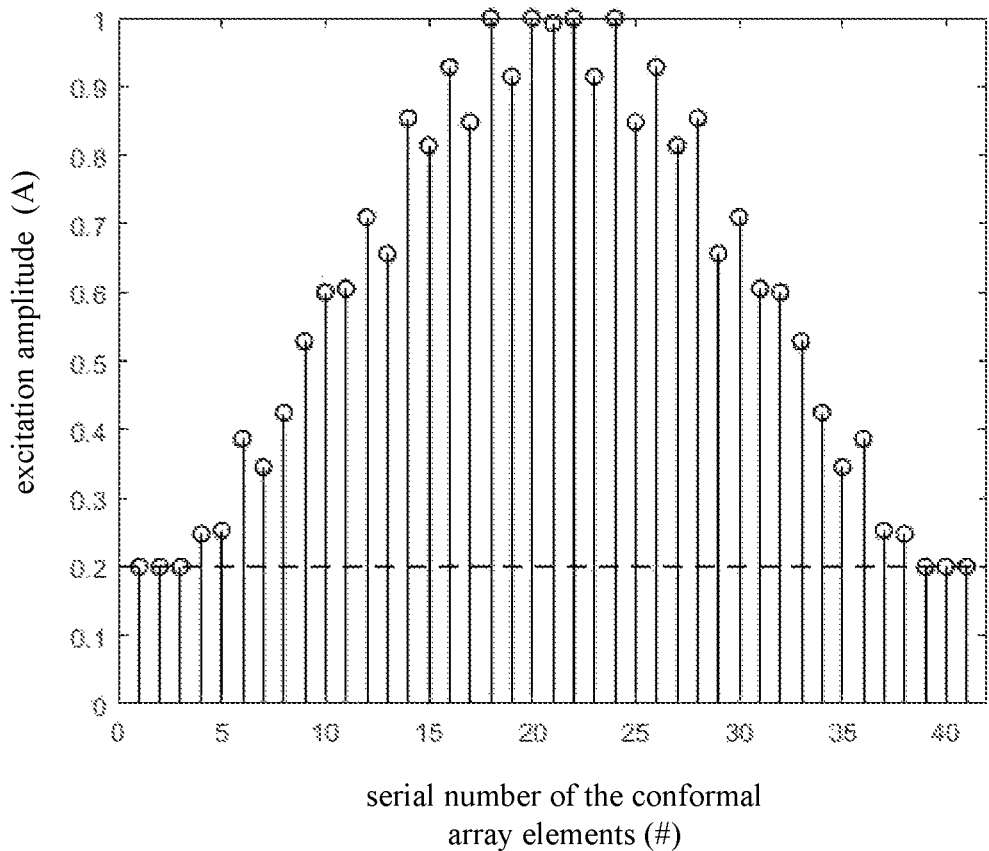
FIG. 9 is a distribution diagram of the array element excitation of the conformal array satisfying multiple optimization objectives under a constraint of a dynamic range ratio (DRR) of the array element excitation amplitude according to some embodiments of the present disclosure.

As shown in FIGS. 7 and 8, when the DRR of the conformal array element excitation amplitude drr=5 and the array pattern is set according to the S1.1, FIG. 7 is a comparison diagram of far-field patterns optimized by a pattern synthesis method and a basic PSO and FIG. 8 is a comparison diagram of optimal fitness values optimized by the pattern synthesis method and the basic PSO algorithm. It can be seen from FIG. 7 that compared with the basic PSO algorithm, the pattern synthesis method of the present disclosure can successfully suppress the peak SLL below −35 dB, constrain the width of the main beam of the first null within 10°, and generate desired null depth at the desired position. FIG. 8 is a curve of the average value of the optimal fitness function obtained from 20 independent experiments varying with the iterations. The curve shows that the pattern synthesis method of the present disclosure may search for a better optimal fitness value, that is, the optimization effect may be better. FIG. 9 shows the excitation distribution of the array elements of the conformal array. It can be seen that the range of the array element excitation satisfying the constraint of the DRR of the array element excitation amplitude drr=5 is [0.2, 1].

In some embodiments of the present disclosure, the array element excitation of the conformal array satisfying the suppression index of the peak SLL under the constraint of the DRR of the array element excitation amplitude may be obtained by taking the suppression index of the peak SLL as the only index to optimize the array element excitation of the conformal array, causing it more suitable for subsequent multi-objective optimization. Then, the array element excitation of the conformal array satisfying the multiple optimization objectives under the constraint of the DRR of the array element excitation amplitude may be obtained through the solution algorithm and the iterations based on the array element excitation of the conformal array satisfying the suppression index of the peak SLL. In the above process, the solution space may be pruned reasonably, and the nonlinear update of the inertia weight coefficient may be designed to ensure that the particles perform sufficient and fine global search in the narrow range, optimize the algorithm design, and improve the problems of slow search speed and easy to fall into local convergence of generating the conformal array pattern.

The basic concepts have been described above. Obviously, for those skilled in the art, the above detailed disclosure is only an example and does not constitute a limitation of the specification. Although not explicitly stated here, those skilled in the art may make various corrections, improvements and amendments to the present disclosure. Such corrections, improvements and amendments are suggested in the present disclosure, so such corrections, improvements and amendments still belong to the spirit and scope of the exemplary embodiments of the present disclosure.

At the same time, the present disclosure uses specific words to describe the embodiments of the present disclosure. For example, "one embodiment", and/or "some embodiments" refer to a feature, structure or feature related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, some features, structures or features in one or more embodiments of the present disclosure can be combined appropriately.

In addition, unless explicitly stated in the claims, the order of processing elements and sequences, the use of numbers and letters, or the use of other names described in the present disclosure are not used to limit the order of processes and methods in the present disclosure. Although some embodiments of the invention currently considered useful have been discussed through various examples in the above disclosure, it should be understood that such details are only for the purpose of illustration, and the additional claims are not limited to the disclosed embodiments. On the contrary, the claims are intended to cover all amendments and equivalent combinations in line with the essence and scope of the embodiments of the specification. For example, although the system components described above can be implemented by hardware devices, they can also be implemented only by software solutions, such as installing the described system on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, this disclosure method does not mean that the object of the present disclosure needs more features than those mentioned in the claims. In fact, the features of the embodiment are less than all the features of the single embodiment disclosed above.

In some embodiments, numbers describing the number of components and attributes are used. It should be understood that such numbers used for the description of embodiments are corrected by the modifiers "about", "approximate" or "generally" in some examples. Unless otherwise stated, "approximately" or "substantially" indicates that a ±20% change in the number is allowed. Accordingly, in some embodiments, the numerical parameters used in the description and claims are approximate values, which can be changed according to the required characteristics of individual embodiments. In some embodiments, the numerical parameters should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials referenced in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later attached to the present disclosure). It should be noted that in case of any inconsistency or conflict between the description, definition and/or use of terms in the auxiliary materials of this manual and the contents described in this manual, the description, definition and/or use of terms in this manual shall prevail.

Finally, it should be understood that the embodiments described in the present disclosure are only used to illustrate the principles of the embodiments of the present disclosure. Other deformations may also fall within the scope of this manual. Therefore, as an example rather than a limitation, the alternative configuration of the embodiments of the present disclosure can be regarded as consistent with the teaching of the present disclosure. Accordingly, the embodiments of the present disclosure are not limited to those explicitly introduced and described in the present disclosure.

What is claimed is:

1. A method implemented on an electromagnetic transceiver including an array antenna for conformal array pattern synthesis based on a solution space pruning particle swarm optimization algorithm (PSO), comprising:

S1: taking a suppression index of a peak side lobe level (SLL) as an only index, performing an array element excitation conversion between a conformal array and a uniform array based on an excitation conversion relationship between a projection array and the conformal array as well as a least square relationship between array element excitation of the projection array and array element excitation of the uniform array, and applying an inverse fast Fourier transform algorithm (IFFT) and a fast Fourier transform algorithm (FFT) to a pattern to generate an array element excitation of the conformal array satisfying the suppression index of the peak SLL under a constraint of a dynamic range ratio (DRR) of array element excitation amplitude;

S2: according to the array element excitation of the conformal array obtained by the S1, pruning a solution space of the PSO, designing a nonlinear updated weight coefficient to ensure sufficient global search, designing a fitness function according to multiple optimization objectives, and further optimizing the conformal array pattern to generate the array element excitation of the conformal array satisfying the multiple optimization objectives under the constraint of the DRR of the array element excitation amplitude, wherein the S1 is realized by following sub steps:

S1.1: setting the multiple optimization objectives according to design indexes, the multiple optimization objectives including a suppression index of a peak SLL in a normalized far-field pattern, a first null maximum width of main beam ($FNMW_e$), expected null positions ($NULL_{point_e}$), and null depths ($NULL_{value_e}$);

S1.2: calculating a wavelength $\lambda$ by setting a count of array elements as N, serial numbers of the array elements as 1~N, a working center frequency of array elements as $f$:

$$\lambda = \frac{c}{f} \quad (1)$$

where $c=3\times10^8$ m/s, c denotes an electromagnetic wave velocity in vacuum;

setting a spacing of the array elements as $\lambda/2$, establishing a global coordinate system by taking a tangent direction of a symmetrical center point of an array as an x-axis direction and a normal direction of the symmetrical center point of the array as a y-axis direction, converting a pattern function $f(\theta)$ of each array element among the array elements in a local coordinate system to a pattern function $f_n(\theta)$ of each array element among the array elements in the global coordinate system, and calculating a far-field pattern $F(\theta)$ of the conformal array:

$$F(\theta) = \sum_1^N A_n f_n(\theta) \cdot \exp(jk\vec{r_n} \cdot \vec{r}) \quad (2)$$

where $A_n$ is an excitation of a $n^{th}$ array element;

$$k = \frac{2\pi}{\lambda},$$

which is a wavenumber; $\vec{r}$ is a far-field direction of the main beam; $\vec{r_n}$ is a position vector of the $n^{th}$ array element in the global coordinate system; and j represents an imaginary unit;

S1.3: setting a maximum DRR of the array element excitation amplitude of the conformal array as drr, and expressing the array element excitation $A_n$ as:

$$A_n = I_n \cdot \exp(j\alpha_n) \quad (3)$$

where $I_n$ is an excitation amplitude of the $n^{th}$ array element, $\alpha_n$ is an excitation phase of the $n^{th}$ array element, calculating a range of $I_n$ to be $$\left[\frac{1}{drr}, 1\right],$$

$\alpha_n = -k\vec{r_n} \cdot \vec{r_0}$, where $\vec{r_0}$ is a position vector of a direction of the main beam in the global coordinate system;

S1.4: randomly initializing the array element excitation of the conformal array within the range of the excitation amplitude determined by the S1.3;

S1.5: setting the direction of the main beam $\theta_0=0°$ as a y-axis direction of the global coordinate system, projecting the conformal array in the direction of the main beam to obtain the projection array, wherein x-axis coordinates of array elements of the projection array are equal to those of corresponding array elements of the conformal array, and a y-axis coordinate is 0; based on an approximately equal peak side lobe level relationship, calculating the excitation conversion relationship between the projection array and the conformal array by following formula:

$$I_{pn} = \frac{I_n \cdot |f_n(\theta_0)|}{|f(\theta_0)|} \quad (4)$$

where $I_{pn}$ is an excitation amplitude of the $n^{th}$ array element of the projection array; $|f_n(\theta_0)|$ is an array element pattern amplitude of the $n^{th}$ array element of the conformal array in the direction of the main beam; $|f(\theta_0)|$ is an array element pattern amplitude of the projection array in the direction of the main beam;

converting the projection array into the uniform array with a smaller spacing by interpolating the projection array according to the smaller spacing, wherein array element of each projection array is represented by a section of array elements of the uniform array centered on the array element of the projection array element; based on a least square relationship between a guidance vector matrix of the projection array and a guidance vector matrix of the uniform array, obtaining an excitation conversion relationship matrix between the projection array and the uniform array:

$$E_C = (E_e^H E_e)^{-1} E_e^H E_p \qquad (5)$$

where $E_p$ is a guidance vector matrix of the projection array, $E_e$ is a guidance vector matrix of the uniform array, $E_C$ is a conversion matrix satisfying the least square relationship;

S1.6: obtaining a far-field pattern of the uniform array, which is a product of an array factor and an array element pattern, wherein the array factor is calculated according to an inverse Fourier transform between the uniform array and the array factor;

S1.7: according to the suppression index of the peak SLL, correcting a value of a pattern sampling point exceeding the suppression index of the peak SLL to a value satisfying the suppression index of the peak SLL;

S1.8: obtaining the array factor by dividing a corrected pattern by the array element pattern, and obtaining array element excitation of the uniform array by Fourier transform;

S1.9: obtaining the array element excitation of the conformal array by inverse operation of the formulas (4) and (5);

S1.10: according to the range of the array element excitation amplitude being $$\left[\frac{1}{drr}, 1\right],$$

correcting the array element excitation of the conformal array to cause it satisfying the constraint of the DRR of the array element excitation amplitude;

S1.11: iteratively performing the S1.5-S1.10, if the array element excitation of the conformal array satisfies the DRR of the array element excitation amplitude and the pattern satisfies the suppression index of the peak SLL, stopping iterations, otherwise, running to a set maximum number of the iterations to obtain the array element excitation of the conformal array satisfying the suppression index of the peak SLL; and S3: performing at least one operation of optimizing a design of an array feed network or providing the optimized design of the array feed network based on the conformal array pattern satisfying the suppression index of the peak SLL and the constraint of the DRR of the array element excitation amplitude.

2. The method of claim 1, wherein the S2 is realized by following sub steps:

S2.1: based on the array element excitation of the conformal array obtained from S1 and the range of the array element excitation amplitude of $$\left[\frac{1}{drr}, 1\right]$$

obtained from the S1.3, pruning the solution space reasonably, each dimension of the particles in the solution space corresponding to one array element excitation of the conformal array, determining a search range of the solution space in a $i^{th}$ dimension as follows:

$$X_i^L = \max\left(X_i^{init} - \sigma, \frac{1}{drr}\right) \qquad (6)$$

$$X_i^U = \min(X_i^{init} + \sigma, 1) \qquad (7)$$

where $X_i^L$ is a lower limit of search range of the particles in the $i^{th}$ dimension, $X_i^U$ is an upper limit of the search range of the particles in the $i^{th}$ dimension, $x^{init}$ is a vector formed by the array element excitation of the conformal array obtained from the S1, dimensions of the $X^{init}$ are equal to the count of the array element of the conformal array, $X_i^{init}$ is a $i^{th}$ dimension of the $X^{init}$, $\sigma$ is a pruning factor of the solution space, which represents a range of the solution space reserved near the array element excitation of the conformal array obtained from the S1;

S2.2: randomly initializing positions and speeds of the particles in the solution space after pruning;

S2.3: calculating a particle fitness according to following formula, and updating an individual optimal value and a global optimal value of population:

$$f = \mu_1 \cdot sll_{total} + \mu_2 \cdot \max((FNMW - FNMW_e), 0) + \mu_3 \cdot$$
$$(10 \cdot |NULL_{point} - NULL_{point_e}| + |NULL_{value} -$$
$$NULL_{value_e}|) \qquad (8)$$

where $sll_{total}$ is a sum of values of the pattern sampling points higher than the suppression index of the peak SLL in values of all pattern sampling points; FNMW and $FNMW_e$ are an actual value and an expected value of the first null beam width; $NULL_{point}$ and $NULL_{point_e}$ are an actual value and an expected value of the null position; $NULL_{value}$ and $NULL_{value_e}$ are an actual value and an expected value of a null value; $\mu_1$, $\mu_2$, and $\mu_3$ and are weight coefficients;

S2.4: calculating and updating the positions and speeds of the particles by following formulas:

$$f = \mu_1 \cdot sll_{total} + \mu_2 \cdot \max((FNMW - FNMW_e), 0) + \mu_3 \cdot$$
$$(10 \cdot |NULL_{point} - NULL_{point_e}| + |NULL_{value} -$$
$$NULL_{value_e}|) \qquad (8)$$

where $\omega$ is an inertia weight coefficient, $c_1$ and $c_2$ are acceleration factors; $r_1$ and $r_2$ are random numbers satisfying a uniform distribution within a range of [0, 1]; $pbest_{id}$ is the individual optimal value; $gbest_d$ is the global optimal value, $V_{id}^k$ is a velocity of the particles in the $i^{th}$ dimension during a $k^{th}$ iteration, $X_{id}^k$ is a position of the particles in the $i^{th}$ dimension during the $k^{th}$ iteration;

S2.5: in order to emphasize sufficient global search during a search process, updating nonlinearly the inertia weight coefficient $\omega$ by following formula:

$$\omega = \left(1 - \left(\frac{k}{T}\right)^3\right) \cdot \omega_r + \omega_0 \qquad (11)$$

where k is a current number of the iterations, T is a maximum number of the iterations, $\omega_r$ is a scaling factor of a range of $\omega$, $\omega_0$ is a minimum value of the range of $\omega$;

S2.6: if the maximum number of the iterations is reached, stopping operation, otherwise turning back the S2.3; finally, obtaining the array element excitation of the conformal array satisfying the optimization objectives set by the S1.1.

\* \* \* \* \*